C. J. TUCKER.
COLLAPSIBLE VEHICLE TOP.
APPLICATION FILED DEC. 30, 1908.
936,960.
Patented Oct. 12, 1909.
2 SHEETS—SHEET 1.
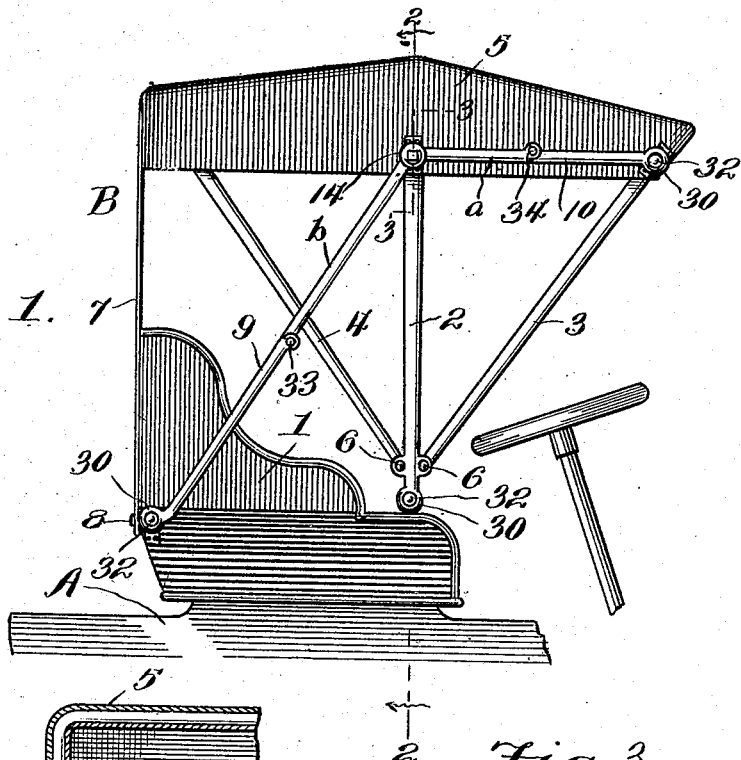
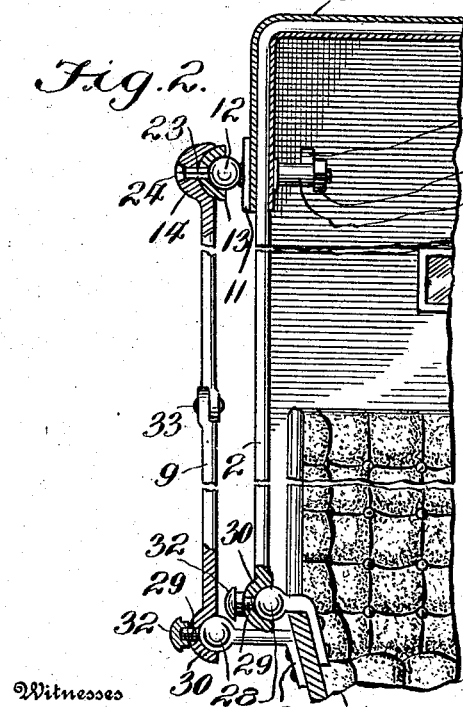
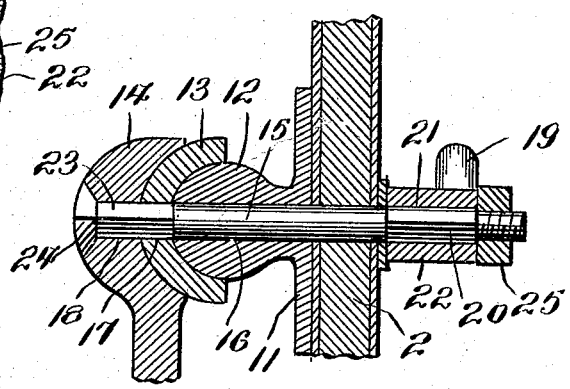
Inventor
Clarence J. Tucker
By Victor J. Evans,
Attorney C. J. TUCKER.
COLLAPSIBLE VEHICLE TOP.
APPLICATION FILED DEC. 30, 1908.
936,960.
Patented Oct. 12, 1909.
2 SHEETS—SHEET 2.
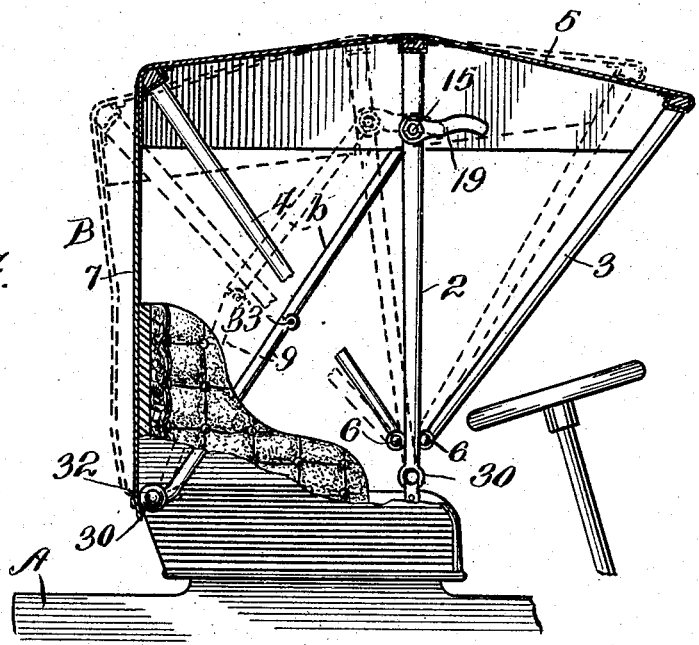
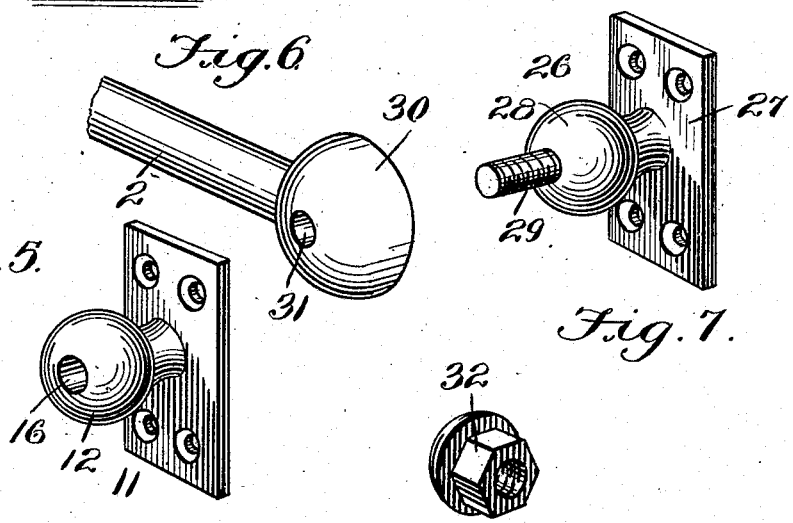
Witnesses
J. T. L. Wright,
C. Bradway.
Inventor
Clarence J. Tucker
By Victor J. Evans,
Attorney

UNITED STATES PATENT OFFICE.

CLARENCE J. TUCKER, OF SENNETT, NEW YORK.

COLLAPSIBLE VEHICLE-TOP.

936,960.

Specification of Letters Patent.

Patented Oct. 12, 1909.

Application filed December 30, 1908. Serial No. 470,020.

*To all whom it may concern:*

Be it known that I, CLARENCE J. TUCKER, a citizen of the United States, residing at Sennett, in the county of Cayuga and State of New York, have invented new and useful Improvements in Collapsible Vehicle-Tops, of which the following is a specification.

This invention relates to a vehicle top for carriages, automobiles and other vehicles, and relates more particularly to a vehicle top of the foldable or collapsible type.

The invention has for one of its objects to improve and simplify the construction and operation of devices of this character so as to be comparatively simple and inexpensive to manufacture, reliable and efficient in use, and so designed as to provide a strong and durable construction whereby rattling will be effectively prevented.

Another object of the invention is the provision of jointed brace rods for holding the top in open position, in combination with means for simultaneously breaking the joints of the brace rods for facilitating the folding or collapsing of the vehicle top.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one embodiment of the invention, Figure 1 is a side view of the vehicle top. Fig. 2 is a sectional view on line 2—2, Fig. 1. Fig. 3 is a detail sectional view on line 3—3, Fig. 1. Fig. 4 is a sectional view of the vehicle top showing the same by full lines in open position, and by dotted lines in the first stage of folding. Fig. 5 is a perspective view of one of the bearing brackets for connecting the jointed brace rods with the top. Fig. 6 is a perspective view of the socketed ends of the brace rods. Fig. 7 is a perspective view of one of the brackets for connecting the bows with the vehicle body. Fig. 8 is a perspective view of the nut used in connection with Fig. 7.

Similar reference characters are employed to designate corresponding parts throughout the views.

Referring to the drawing, A designates a vehicle body of ordinary construction having a seat 1, and arranged over the seat is a foldable top B. This top comprises a central bow 2 and front and rear oblique bows 3 and 4 which, together with the central bow, carry the canopy or cover 5 made of flexible material in the usual manner. The bows 3 and 4 are connected with the central bow 2 by pivots 6 whereby the bows can fold together in the collapsing of the top, the top being provided with the usual back 7 which has its lower edge secured to the vehicle seat by buttons 8. Between the upper ends of the side members of the central bow and the rear corners of the seat are jointed brace rods 9 which serve to hold the top in open position and from falling backwardly as the wagon jolts. Between the central bow and front bow are jointed brace rods 10 which coöperate with the brace rods 9 to hold the top stretched open. At the points where the brace rods 9 and 10 are connected with the top, bearing brackets 11 are provided which are secured to the central bow in any suitable manner and these brackets are formed with spherical enlargements or bearing balls 12 over which fit the hollow hemi-spherical sockets 13 on the rear ends of the rear sections *a* of the brace rods 10 and, in turn, fitting over the sockets 13 are sockets 14 on the top ends of the upper sections *b* of the rods 9. The sockets 13 and 14 are held in operative position with respect to each other and to the ball 12 by a bolt 15 that passes through a passage 16 in the bearing bracket 11 and through apertures 17 and 18 in the sockets 13 and 14, respectively, the bolt also passing through the central rib 2 of the top B. On the inner end of the bolt is an operating lever or handle 19, as shown in Figs. 3 and 4, located within the vehicle top to be within convenient reach of the occupant of the vehicle so that the joints of the brace rods can be broken or set in folding or unfolding the vehicle top. The bolt has a squared portion 20 which fits in a squared opening 21 in the hub 22 of the handle and the outer portion 23 of the bolt is squared to fit in the apertures 17 and 18 which are also squared so that as the bolt, which constitutes the rock shaft, is rocked by the handle 19, the brace rods 9 and 10 can be collapsed or straightened. The outer end of the bolt or rock shaft 15 has a head 24 that is set into the socket 14 to be flush with the outer surface thereof and this head coöperates with a nut 25 for fastening the parts together. As the parts wear away, the nut 25 can be tightened so that rattling will be effectively prevented.

At the points where the central bows and brace rods 9 are connected with the vehicle body and where the brace rods 10 are connected with the vehicle top, are bearing brackets 26, as shown in Fig. 7, each bracket consisting of a base plate and a spherical head or ball 28, and extending outwardly from the ball is a threaded stud 29. The brace rod and the bow are formed with a hollow hemi-spherical socket 30, as shown in Fig. 6, which has an opening 31 through which the threaded stud 29 extends and on this stud is a cap nut or bur 32 which clamps the parts together.

When the top is open, the parts are in the position shown in Fig. 1, and it will be noted that the joints 33 and 34 of the brace rods 9 and 10 are locked so that the top will be stretched open and prevented from vibrating or collapsing under shocks incident to the travel of the vehicle over rough places in the roadway. When it is desired to lower the vehicle top, the occupant grasps the levers or handles 19 and forces the forward ends thereof downwardly so as to rock the shafts or bolts 15. This will cause the joints of the brace rods 9 and 10 to be broken so that the top will fold backwardly in the usual manner, the joints 33 moving forwardly while the joints 34 move upwardly.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim is:—

1. In a folding vehicle top comprising pivoted bows, a canopy and jointed braces, the meeting ends of the adjacent sections of the braces terminating in hollow hemispherical sockets which are overlapped, a ball bearing for said sockets secured to one of said bows, a rock shaft mounted in said ball bearing and extending beyond the same at both ends, one end of the rock shaft being connected with said hollow hemispherical sockets to turn therewith, and a handle secured to the opposite end of the rock shaft for operating the latter for breaking or straightening the joints of the aforesaid jointed braces.

2. In a folding vehicle top comprising pivoted bows, a canopy and jointed braces, the meeting ends of the adjacent sections of the braces terminating in hollow hemispherical sockets which are overlapped, a bearing bracket secured to one of said bows and provided with a ball receiving the said hollow hemispherical sockets, a rock shaft mounted in said bearing bracket to both turn and move longitudinally therein and having its opposite ends extended, one of said ends passing through the overlapped hollow hemispherical sockets and connected therewith to cause them and the rock shaft to move in unison, an operating handle slipped upon the opposite end of the rock shaft and adapted to turn therewith, and a set nut threaded upon an end of the rock shaft to move the same longitudinally and take up any lost motion.

3. A folding vehicle top, comprising pivoted bows, a canopy and jointed braces, the ends of the intermediate bows and the braces terminating in hollow hemispherical sockets which are centrally apertured, bearing brackets receiving the hollow hemispherical sockets of said intermediate bow and the jointed braces, the latter having their socketed ends overlapped, a rock shaft mounted in the bearing bracket receiving the overlapped socketed ends of the jointed braces and having one end passed through said overlapped sockets and connected thereto for rotation therewith, a handle mounted upon the opposite end of the rock shaft to turn with the latter, and a set nut threaded upon an end of the rock shaft for taking up any lost movement in the parts.

In testimony whereof I affix my signature in presence of two witnesses.

CLARENCE J. TUCKER.

Witnesses:
 BETTIE B. CROSSMAN,
 HARRIET M. TUCKER.